(12) United States Patent
Tsai

(10) Patent No.: US 10,691,153 B1
(45) Date of Patent: Jun. 23, 2020

(54) EFFICIENCY IMPROVEMENT FOR A DC-TO-DC BUCK VOLTAGE REGULATOR

(71) Applicant: DELL PRODUCTS L.P., Round Rock, TX (US)

(72) Inventor: Meng-Ru Tsai, Xizhi District (TW)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 16/423,530

(22) Filed: May 28, 2019

(51) Int. Cl.
*G05F 1/62* (2006.01)
*G05F 1/56* (2006.01)
*H02M 1/00* (2006.01)

(52) U.S. Cl.
CPC ............... *G05F 1/62* (2013.01); *G05F 1/561* (2013.01); *G05F 1/562* (2013.01); *H02M 2001/0074* (2013.01)

(58) Field of Classification Search
CPC ... G05F 1/561; G05F 1/62; H02M 2001/0074
USPC ......... 323/266, 270, 271, 282, 289; 327/589
See application file for complete search history.

(56) References Cited

U.S. PATENT DOCUMENTS

| 6,930,893 | B2 | 8/2005 | Vinciarelli | |
| 8,125,200 | B2* | 2/2012 | Tsai | H02M 3/1584 323/267 |
| 2002/0039298 | A1 | 4/2002 | Riggio et al. | |
| 2004/0174147 | A1 | 9/2004 | Vinciarelli | |
| 2006/0038547 | A1* | 2/2006 | Ahmad | H02M 1/08 323/284 |
| 2006/0250188 | A1* | 11/2006 | Kaya | H03F 3/217 330/277 |
| 2009/0225575 | A1 | 9/2009 | Vinciarelli | |
| 2010/0001703 | A1 | 1/2010 | Williams | |
| 2010/0001704 | A1 | 1/2010 | Williams | |
| 2012/0001608 | A1* | 1/2012 | Sato | H02M 3/1588 323/282 |
| 2012/0249099 | A1* | 10/2012 | Konecny | H03F 3/217 323/271 |

FOREIGN PATENT DOCUMENTS

| CN | 100464922 C | 11/2001 |
| CN | 101168210 | 7/2010 |
| EP | 1333566 | 8/2003 |
| JP | 4303714 | 5/2009 |

* cited by examiner

*Primary Examiner* — Gary A Nash
(74) *Attorney, Agent, or Firm* — Jackson Walker LLP; Christopher J. Rourk

(57) ABSTRACT

A circuit comprising a first driver having an input, an output and a power input, and a first regulator having an input, an output coupled to the first driver, and an adjustment control configured to control a voltage of the first regulator. A second driver having an input, an output and a power input, and a second regulator having an input, an output coupled to the second driver, and an adjustment control configured to control a voltage of the second regulator. A first impedance coupled to the adjustment control of the first regulator and configured to selectably increase or decrease the voltage of the first regulator.

20 Claims, 2 Drawing Sheets

EFFICIENCY IMPROVEMENT FOR A DC-TO-DC BUCK VOLTAGE REGULATOR

TECHNICAL FIELD

The present disclosure relates generally to electronic circuits, and more specifically to efficiency improvement for a DC-to-DC buck voltage regulator that uses external resistors to control gate drive voltages for integrated drivers.

BACKGROUND OF THE INVENTION

DC-to-DC buck voltage regulators are known in the art, but suffer from numerous problems that result in loss of efficiency.

SUMMARY OF THE INVENTION

A circuit is disclosed that includes a first driver having an input, an output and a power input, and a first regulator having an input, an output coupled to the first driver, and an adjustment control configured to control a voltage of the first regulator. The circuit also includes a second driver having an input, an output and a power input, and a second regulator having an input, an output coupled to the second driver, and an adjustment control configured to control a voltage of the second regulator. A first impedance is connected to the adjustment control of the first regulator, and is configured to selectably increase or decrease the voltage of the first regulator.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
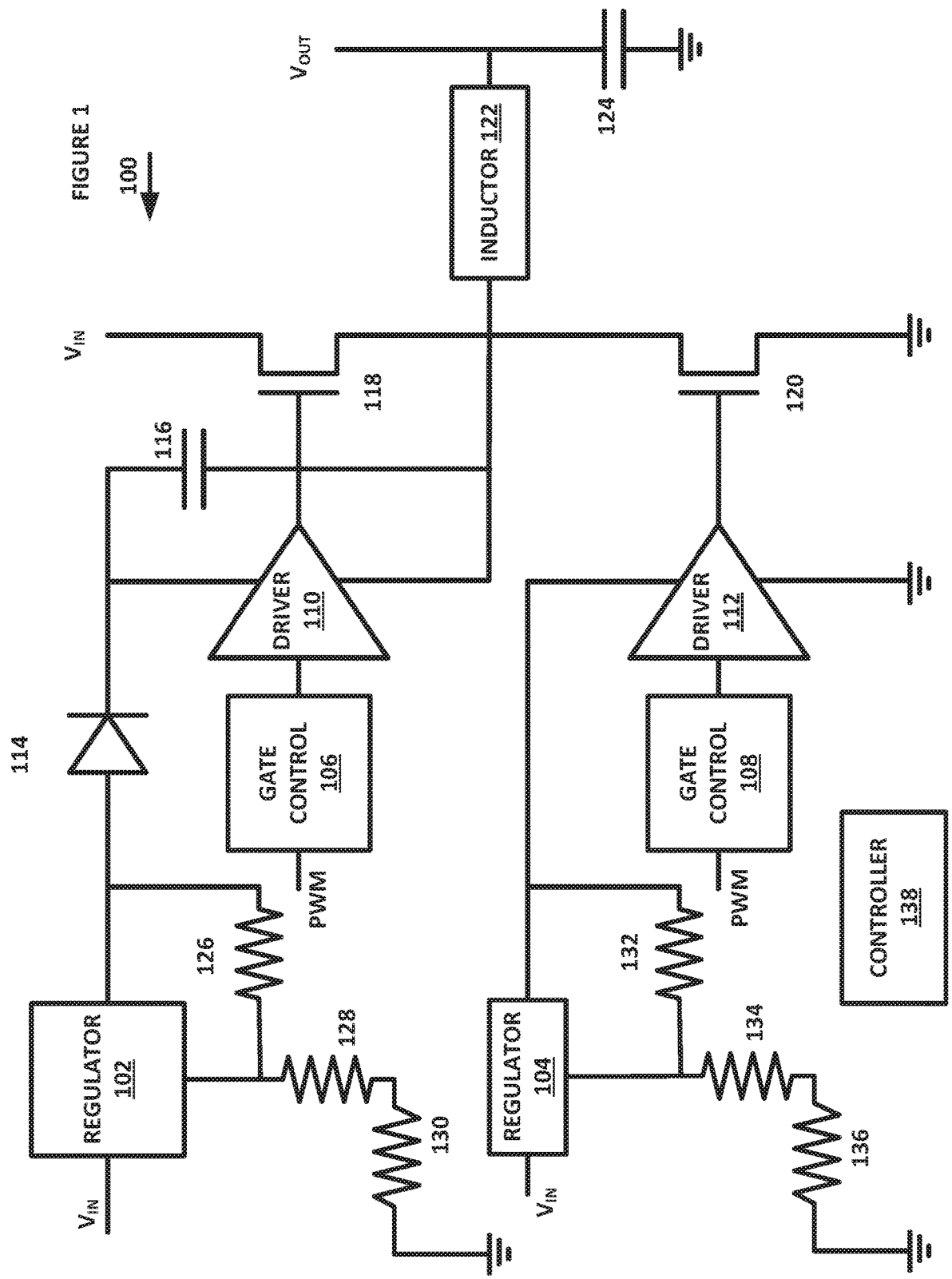
FIG. 1 is a diagram of an integrated circuit including a DC to DC buck voltage regulator with an adjustable drive voltage, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

High power efficiency is one goal that can be sought for a DC-to-DC buck voltage regulator design. One way to improve efficiency is to improve component characteristics of high power loss parts, such as by lowering the drain-source on state resistance ($R_{DS\_ON}$) and the total gate charge ($Q_g$) of MOSFETs. These parameters typically require manufacturing process modifications to obtain better component characteristics. However, reducing the power loss of components can be accomplished in other ways besides improving component characteristics. For example, the gate drive voltage can be used to decrease the loss of power MOSFETs. The gate drive voltage is functionally related to conduction loss of $R_{DS\_ON}$ and switching loss of $Q_g$ for high power MOSFETs, but existing technology uses a single and constant gate drive voltage for both high side and low side MOSFETs in a buck voltage converter application. The present disclosure uses two embedded and individual gate drive voltages in a gate driver component to obtain better power loss improvement for both high side and low side MOSFETs.

The gate voltage level can be adjusted using an external resistor or in other suitable manners, to identify a gate voltage level that corresponds to an optimal efficiency. This configuration can be used when a pulse width modulation (PWM) switching duty cycle of a buck voltage converter is high, to induce higher conduction loss on its high side MOSFETs due to higher $R_{DS\_ON}$. For buck voltage converter design, a lower $Q_g$ for high side MOSFETs and lower $R_{DS\_ON}$ for low side MOSFETs can be used, but may be more effective when a PWM duty cycle is low. The present disclosure provides a more flexible and easier to implement gate drive voltage adjustment process that can be used during a development stage to identify an optimal gate drive voltage level for efficiency improvement.

A single and constant voltage can be used as the gate drive for both high side and low side MOSFETs in a DC-to-DC buck voltage regulator design, but that configuration typically will not result in an optimum performance or reduction in power loss for both high side and low side MOSFETs. For example, for a low PWM duty cycle buck converter, the output voltage level is normally lower than 50% of the input voltage. As a result, the turn-on time of the low side MOSFET is longer than the turn-on time of the high side MOSFET. A longer MOSFET turn-on time can induce a higher conduction loss, due to the $R_{DS\_ON}$ of MOSFETs. Selecting a lower $R_{DS\_ON}$ for the low side MOSFET limits most of the conduction loss to the $R_{DS\_ON}$ of the low side MOSFET. Based on the characteristic of $R_{DS\_ON}$ versus $V_{GS}$ in an N-channel MOSFET, a higher $V_{GS}$ gate drive voltage will result in a lower $R_{DS\_ON}$. An example of measured $R_{DS\_ON}$ values are shown in the table below:

| Drain Source On-State Resistance (Note 3) | $V_{GS}$ = 10 V, $I_D$ = 11 A $V_{GS}$ = 10 V, $I_D$ = 11 A | $R_{DS(on)}$ | — — | 8.3 11.9 | 11.7 14.9 | mΩ |

Equations that define a brief conduction loss calculation for both high side and low side MOSFETs are shown below:

$$P_{COND_{HI\_SIDE}} = I_{OUT}^2 * R_{DS\_ON\_HI} * D \quad \text{(EQ-1)}$$

$$P_{COND_{LO\_SIDE}} = I_{OUT}^2 * R_{DS\_ON\_LO} * (1-D) \quad \text{(EQ-2)}$$

Equations EQ-1 and EQ-2 show that a lower $R_{DS\_ON}$ results in a lower $P_{COND}$, and also show that a lower PWM duty cycle, D, makes the conduction loss of a high side MOSFET lower than the conduction loss of the low side, if the $R_{DS\_ON}$ of high side and low side MOSFETs are the same. However, for a higher PWM duty cycle application, the result is different. If the duty cycle D is over 50%, then the conduction loss of high side MOSFETs is higher. For this case, a high side MOSFET with lower $R_{DS\_ON}$ results in a lower conduction loss.

For high side MOSFETs, a lower $Q_g$ parameter can be selected. The following equation defines the high side switching loss calculation between the drain and the source in a MOSFET:

$$P_{SW_{HI\_SIDE}} = \frac{V_{IN} * I_{OUT}}{2} * (t_2 + t_3) * F_{SW}, \, t_x = \frac{Q_{G(X)}}{I_{DRIVER}} \quad \text{(EQ-3)}$$

As shown above, a lower value of $Q_g$ results in a faster turn-on time with shorter $t_x$ time to reduce the switching loss $P_{SW}$. In addition, the following equation can be used to determine the gate charge switching loss for high side MOSFETs. The value of $V_{DD}$ is the gate drive voltage that is required to drive high side MOSFETs on:

$$P_{Gate_{HI\_SIDE}} = Q_G * V_{DD} * F_{SW} \quad \text{(EQ-4)}$$

With a lower gate drive voltage and a lower $Q_g$, the gate charge loss, $P_{Gate}$, is also lower. A high side MOSFET with lower $Q_g$ can thus help to reduce the switching loss.

Based on this analysis, it can be seen that a higher gate voltage can result in a lower $R_{DS\_ON}$ to reduce the conduction loss on low side MOSFETs, and lower gate voltage can reduce the $P_{Gate}$ on high side MOSFETs. With a single and constant gate voltage for both high side and low side MOSFETs, it is difficult to find a gate drive voltage that can reduce the loss of high side and low side simultaneously, to obtain better efficiency performance. In addition, a single and constant gate voltage is not helpful for applications that have a higher PWM duty cycle. In order to lower the conduction loss on high side MOSFETs, the gate drive voltage should be increased to get a lower $R_{DS\_ON}$ on the high side MOSFETs.

The present disclosure provides a number of example embodiments and other teachings that can advantageously be used to improve efficiency. In one example embodiment, two individual and different gate drive voltages for the high side and low side MOSFETs in a buck voltage regulator can be used. These gate driver voltages can be individually adjusted according to the MOSFETs that are selected, to improve efficiency performance. In this example, for a low PWM duty cycle application, a lower gate drive voltage of high side MOSFETs can be used to reduce the gate charge switching loss of high side, and to increase the gate drive voltage of low side MOSFETs, to lower the conduction loss of low side. This configuration is different from using the same gate drive voltage for both high side and low side MOSFETs.

Because the gate drive voltages for high side and low side MOSFETs are adjustable individually, power efficiency can be optimized, such as for a high PWM duty cycle in buck voltage converter design. In this example embodiment, as a result of the high duty cycle, the conduction loss for the high side MOSFETs is larger, due to a longer turn-on time. In order to obtain better efficiency by reducing the conduction loss of $R_{DS\_ON}$ in high side MOSFETs, the gate drive voltage of the high side MOSFETs can be adjusted to a higher level, which reduces the $R_{DS\_ON}$ value of the high side MOSFETs and to obtain a lower conduction loss.

Two individual linear voltage regulators can be used in an integrated MOSFET gate drive silicon circuit, to generate different gate drive voltages for the high side and low side MOSFETs, respectively. An external resistor can be provided for each of these integrated linear voltage regulators, to allow their voltage levels to be adjusted so as obtain a lower total loss on the MOSFETs. These two linear voltage regulators can be used to convert the input voltage source of the buck voltage regulator to a suitable gate drive power. In contrast, constant gate drive voltages for MOSFETs don't allow for the adjustment of the gate voltage. The present disclosure provides an easy way to adjust the gate drive voltage by using the external resistor, which improves the power efficiency of the buck voltage converter.

FIG. 1 is a diagram of an integrated circuit 100 including a DC to DC buck voltage regulator with an adjustable drive voltage, in accordance with an example embodiment of the present disclosure. Integrated circuit 100 includes regulators 102 and 104, gate controls 106 and 108, drivers 110 and 112, resistances 126, 128, 130, 132, 134 and 136, diode 114, capacitors 116 and 124, transistors 118 and 120, inductor 122 and controller 138, and can be implemented in silicon or other suitable materials.

Resistors 130 and 136 can be external resistors that are separate from the integrated components of integrated circuit 100, and can either be fixed or variable and used to individually adjust the gate drive voltages for high side MOSFET 118 and low side MOSFET 120. As shown in FIG. 1, two linear voltage low drop-out (LDO) regulators 102 and 104 can be included in integrated circuit 100 to convert input voltage $V_{IN}$ to high side gate driver 110 and input voltage of low side gate driver 112, respectively. Each of regulators 102 and 104 can adjust the gate drive voltage provided to drivers 110 and 112, respectively, as a function of external resistors 130 and 136, respectively, which can be provided outside of an integrated circuit that contains the other components of integrated circuit 100. Regulators 102 and 104 can be simple 3-terminal linear voltage regulators, and in one example embodiment can be an LM317 linear voltage regulator available from Texas Instruments, STMicroelectronics, ON Semiconductor or other suitable sources.

A constant reference voltage can be provided between an output pin and an adjustment pin for regulators 102 and 104 when they operate to output the gate drive voltages, which can be adjusted by external resistors 130 and 136 in accordance with the following equations:

$$V_{OUT\text{-}REGULATOR\ 102} = (1.25/(\text{resistor } 126))((\text{resistor } 128 + \text{resistor } 130)) \quad \text{(EQ-5)}$$

$$V_{OUT\text{-}REGULATOR\ 104} = (1.25/(\text{resistor } 132))((\text{resistor } 134 + \text{resistor } 136)) \quad \text{(EQ-6)}$$

Resistors 126, 128, 132 and 134 can be embedded in integrated circuit 100 and used to set up a minimum gate drive voltage to turn on MOSFET 118 and 120. In one example embodiment, a voltage of 5V to 6V can be provided in order to ensure that the gate drive voltage is higher than the threshold voltage of the gate to source threshold voltage of MOSFET 118 and 120 when the value of resistors 130 and/or 136 are 0 ohms (shorted to GND). From EQ-5 and EQ-6, when resistors 130 and/or 136 are increased, $V_{OUT\text{-}REGULATOR\ 102}$ and/or $V_{OUT\text{-}REGULATOR\ 104}$, respectively, are adjusted to a higher voltage level. In one example embodiment, resistors 130 and 136 can be increased individually to adjust the gate drive voltage higher for high side MOSFET 118 or low side MOSFET 120, in order to reduce their conduction loss where a higher gate drive voltage can reduce the drain to source on resistance of MOSFETs 118 and 120.

Controller 138 can be implemented in hardware or a suitable combination of hardware and software, and can adjust $V_{IN}$, the duty cycle of PWM, resistance values of resistors 130 and 136 or other suitable controllable variables of integrated circuit 100. In one example embodiment, controller 138 can be included as part of integrated circuit 100, as a separate component, as a programmable controller or in other suitable manners, and can be coupled to one or more of the other components shown in FIG. 1 by conducting vias of integrated circuit 100, conductors or in other suitable manners.

Figure 2:
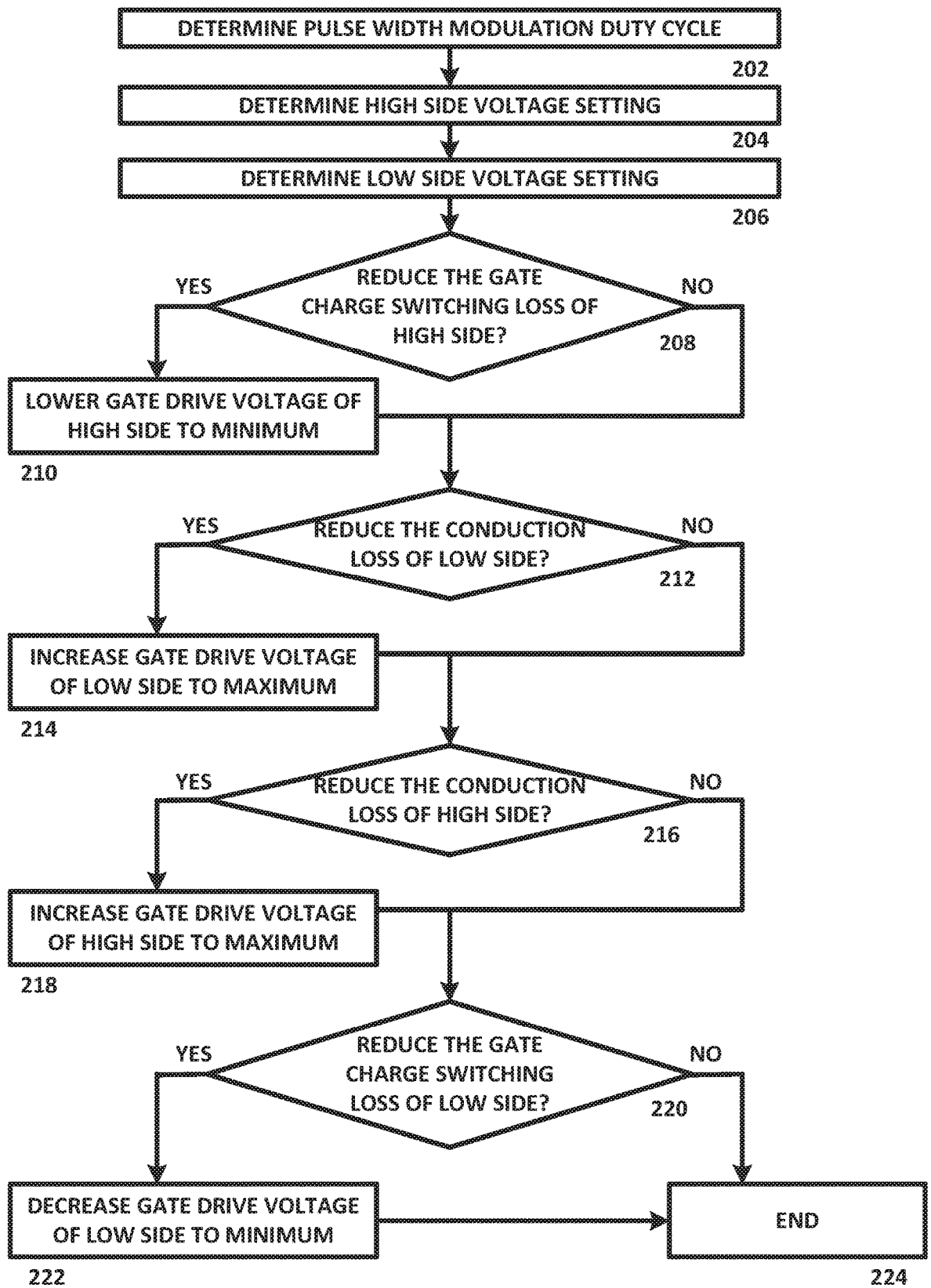
FIG. 2 is a diagram of an algorithm for optimizing the efficiency of a buck regulator, in accordance with an example embodiment of the present disclosure.

FIG. 2 is a diagram of an algorithm 200 for optimizing the efficiency of a buck regulator, in accordance with an example embodiment of the present disclosure. Algorithm 200 can be implemented in hardware or a suitable combination of hardware and software.

Algorithm 200 begins at 202, where a pulse width modulation duty cycle is determined. In one example embodiment the pulse width modulation duty cycle can be based on values of inductor 122, capacitor 124, settings for $V_{IN}$ and $V_{OUT}$ and other suitable parameters. The algorithm then proceeds to 204.

At 204, a high side voltage setting is determined. In one example embodiment the high side voltage setting can include a minimum and maximum operational voltage setting based on values of inductor 122, capacitor 124, settings for $V_{IN}$ and $V_{OUT}$ and other suitable parameters. The algorithm then proceeds to 206.

At 206, a low side voltage setting is determined. In one example embodiment the low side voltage setting can include a minimum and maximum operational voltage setting based on values of inductor 122, capacitor 124, settings for $V_{IN}$ and $V_{OUT}$ and other suitable parameters. The algorithm then proceeds to 208.

At 208, a gate charge switching loss of the high side is determined. If it is determined that the gate charge switching loss of the high side should be reduced, the algorithm proceeds to 210, where the gate drive voltage of the high side is lowered to a minimum, and the algorithm then proceeds to 212. Otherwise, the algorithm proceeds directly to 212.

At 212, a conduction loss of the low side is determined. If it is determined that the conduction loss of the low side should be reduced, the algorithm proceeds to 214, where the gate drive voltage of the low side is increased to a maximum, and the algorithm then proceeds to 216. Otherwise, the algorithm proceeds directly to 216.

At 216, a conduction loss of the high side is determined. If it is determined that the conduction loss of the high side should be reduced, the algorithm proceeds to 218, where the gate drive voltage of the high side is increased to a maximum, and the algorithm then proceeds to 220. Otherwise, the algorithm proceeds directly to 220.

At 220, a gate charge switching loss of the low side is determined. If it is determined that the gate charge switching loss of the low side should be reduced, the algorithm proceeds to 222, where the gate drive voltage of the low side is lowered to a minimum, and the algorithm then proceeds to 224. Otherwise, the algorithm proceeds directly to 224 and terminates.

Although algorithm 200 is shown in flow chart format, it can also or alternatively be implemented using object oriented programming, ladder diagrams, state diagrams or in other suitable manners.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A circuit comprising:
a first driver having an input, an output and a power input;
a first regulator having an input, an output coupled to the first driver, and an adjustment control configured to control a voltage of the first regulator;
a gate control coupled to the first driver, the gate control configured to receive a pulse width modulation input, and wherein the voltage of the first regulator is selected as a function of the pulse width modulation input;
a second driver having an input, an output and a power input;
a second regulator having an input, an output coupled to the second driver, and an adjustment control configured to control a voltage of the second regulator; and
a first impedance coupled to the adjustment control of the first regulator and configured to selectably increase or decrease the voltage of the first regulator.

2. The circuit of claim 1 further comprising a second impedance coupled to the adjustment control of the second regulator and configured to selectably increase or decrease the voltage of the second regulator.

3. The circuit of claim 2 further comprising a third impedance coupled to the second impedance.

4. The circuit of claim 2 further comprising a third impedance coupled to the adjustment control of the second regulator.

5. The circuit of claim 1 further comprising a second impedance coupled to the first impedance.

6. The circuit of claim 1 further comprising a second impedance coupled to the adjustment control of the first regulator.

7. The circuit of claim 1 further comprising a gate control coupled to the second driver, the gate control configured to receive a pulse width modulation input, and wherein the voltage of the second regulator is selected as a function of the pulse width modulation input.

8. The circuit of claim 1 further comprising a second impedance coupled to the first impedance and a third impedance coupled to the adjustment control of the first regulator.

9. The circuit of claim 1 further comprising:
a gate control coupled to the second driver, the gate control configured to receive a pulse width modulation input, and wherein the voltage of the second regulator is selected as a function of the pulse width modulation input; and
a second impedance coupled to the first impedance.

10. A method for controlling a circuit, comprising:
receiving a pulse width modulation signal at a first gate control to generate a first gate control signal;
receiving the first gate control signal at a first driver to generate a first output;
adjusting a resistance coupled to an input of a first regulator to control an output voltage of the first regulator that is provided to the first driver;
receiving the pulse width modulation signal at a second gate control to generate a second gate control signal;
receiving the second gate control signal at a second driver to generate a second output; and
adjusting a resistance coupled to an input of a second regulator to control an output voltage of the second regulator that is provided to the second driver.

11. The method of claim 10 further comprising selectably increasing or decreasing the output voltage of the first regulator.

12. The method of claim 11 further comprising selectably increasing or decreasing the output voltage of the second regulator.

13. The method of claim 10 further comprising selectably increasing or decreasing the output voltage of the second regulator.

14. The method of claim 10 further comprising:
determining an optimal setting for the output voltage of the first regulator; and
adjusting the resistance coupled to the input of the first regulator to control the output voltage of the first regulator to the optimal setting for the output voltage of the first regulator.

15. The method of claim 14 further comprising:
determining an optimal setting for the output voltage of the second regulator; and
adjusting the resistance coupled to the input of the second regulator to control the output voltage of the second regulator to the optimal setting for the output voltage of the second regulator, wherein the optimal setting for the output voltage of the first regulator is different from the optimal setting for the output voltage of the second regulator.

16. The method of claim 15 wherein determining the optimal setting for the output voltage of the first regulator is performed as a first function of a pulse width modulation duty cycle and determining the optimal setting for the output voltage of the second regulator is performed as a second function of the pulse width modulation duty cycle.

17. The method of claim 14 wherein determining the optimal setting for the output voltage of the first regulator is performed as a function of a pulse width modulation duty cycle.

18. The method of claim 10 further comprising:
determining an optimal setting for the output voltage of the second regulator; and
adjusting the resistance coupled to the input of the second regulator to control the output voltage of the second regulator to the optimal setting for the output voltage of the second regulator.

19. The method of claim 18 wherein determining the optimal setting for the output voltage of the second regulator is performed as a function of a pulse width modulation duty cycle.

20. In a circuit comprising a first driver having an input, an output and a power input, a first regulator having an input, an output coupled to the first driver, and an adjustment control configured to control a voltage of the first regulator, a second driver having an input, an output and a power input, a second regulator having an input, an output coupled to the second driver, and an adjustment control configured to control a voltage of the second regulator, a first impedance coupled to the adjustment control of the first regulator and configured to selectably increase or decrease the voltage of the first regulator, a second impedance coupled to the adjustment control of the second regulator and configured to selectably increase or decrease the voltage of the second regulator, the second impedance coupled to the first impedance and to the adjustment control of the first regulator, a third impedance coupled to the second impedance and to the adjustment control of the second regulator, a gate control coupled to the first driver, the gate control configured to receive a pulse width modulation input, and wherein the voltage of the first regulator is selected as a function of the pulse width modulation input, the gate control coupled to the second driver, the gate control configured to receive a pulse width modulation input, and wherein the voltage of the second regulator is selected as a function of the pulse width modulation input, a method comprising:

receiving a pulse width modulation signal at a first gate control to generate a first gate control signal;
receiving the first gate control signal at a first driver to generate a first output;
adjusting a resistance coupled to an input of a first regulator to control an output voltage of the first regulator that is provided to the first driver;
receiving the pulse width modulation signal at a second gate control to generate a second gate control signal;
receiving the second gate control signal at a second driver to generate a second output;
adjusting a resistance coupled to an input of a second regulator to control an output voltage of the second regulator that is provided to the second driver
selectably increasing or decreasing the output voltage of the first regulator;
selectably increasing or decreasing the output voltage of the second regulator;
determining an optimal setting for the output voltage of the first regulator;
adjusting the resistance coupled to the input of the first regulator to control the output voltage of the first regulator to the optimal setting for the output voltage of the first regulator;
determining an optimal setting for the output voltage of the second regulator;
adjusting the resistance coupled to the input of the second regulator to control the output voltage of the second regulator to the optimal setting for the output voltage of the second regulator, wherein the optimal setting for the output voltage of the first regulator is different from the optimal setting for the output voltage of the second regulator, wherein determining the optimal setting for the output voltage of the first regulator is performed as a first function of a pulse width modulation duty cycle and determining the optimal setting for the output voltage of the second regulator is performed as a second function of the pulse width modulation duty cycle.

* * * * *